Patented Oct. 17, 1950

2,526,591

UNITED STATES PATENT OFFICE 2,526,591

FILLING MATERIAL FOR SECONDARY DRY-ACCUMULATOR BATTERIES

Jonas Abraham Szper, Barking, England, assignor, by mesne assignments, to Leonard Fuller, London, England, and Edmund William Sudlow, Leigh-on-Sea, England No Drawing. Application August 4, 1947, Serial No. 766,087. In Great Britain December 13, 1939

Section 1, Public Law 690, August 8, 1946
Patent expires December 13, 1959

9 Claims. (Cl. 136—146)

This invention relates to electric cells and batteries and more particularly to the separating material which is used for electrically insulating the electrodes from one another. It is well known that the material to be used for this purpose, in addition to being a good electrical insulator, should be porous and should also be capable of resisting the corroding or disintegrating effect of the electrolyte and the products of the electroylsis when the cell is in use.

It is the primary object of the present invention to provide an improved process for producing separating elements, the latter being intended particularly for use in the so-called dry cells where the electrolyte is substantially wholly absorbed within the electrodes and the separating element material. In particular the invention is concerned with the production of an efficient separating element for lead-acid electric secondary cells of the so-called dry type.

It has been found that separators for use in such cells should be devoid of openings or cavities into which the active material might find its way, but said separators should nevertheless be thoroughly absorbent and should have a highly developed form of surface which enables the electrolyte to have free access to practically the whole surface of the active material of the said electrodes. In this connection porous rubber and like separators have been found to be deficient, for the pores are usually sufficiently large to enable the active material to disintegrate and eventually form a leakage path between the electrodes. Moreover the rubber bounding the pores tends to adhere to the surface of the electrodes, thus isolating a certain amount of the active material from the electrolyte and diminishing the efficiency of the cell.

In British specification No. 377,257 it is proposed to produce separators for electric accumulators by using a mixture comprising rubber latex, sufficient sulphur to convert the latex to hard rubber when vulcanised, water, and diatomaceous earth, the mixture being made up in such a manner that there will be approximately 25% by weight of vulcanised hard rubber in the resultant material. The mixture is moulded upon the sheets of glass wool by rolling or hydraulic pressure, and the resulting sheets are vulcanised in the usual way.

In a process for producing a separator for insertion between the electrodes of an electric cell, in which process glass wool in sheet form is consolidated by the application of a mixture comprising a finely powdered space, electrolyte absorbing material, and natural or synthetic rubber as a binding agent, according to the present invention the treated glass wool, after drying, is subjected to pressure sufficient to render it relatively smooth and compact without impairing the electrolyte absorbing quality of the powdered material, but is not subsequently vulcanised, thus producing a finished separator having a compact absorbent texture, which separator has the particles of absorbent powdered material bonded by a material having a soft resilient nature.

Further, in a process for producing a separator for insertion between the electrodes of an electric cell, in which glass wool in sheet form is consolidated by the application of a mixture comprising a finely powdered absorbent material, such as kieselguhr, and rubber as a binding agent, the present invention is characterised by the fact that the binding agent comprises a pre-vulcanised rubber latex, or the latex of synthetic rubber, the treated glass wool, that is the glass wool with the bonded powdered absorbent material applied thereon after drying, being subjected to pressure sufficient to render the absorbent material application relatively smooth and compact without subsequent vulcanisation to produce the finished separator, which latter has the particles of powdered absorbent material bonded by a material having a soft resilient nature. By thus avoiding the vulcanisation of the mixture after it has been applied to the glass wool, the likelihood of free sulphur being present in the finished separator is considerably reduced. The importance of the use of the pre-vulcanized binding agent, which comprises an aqueous dispersion of a vulcanized elastomer, cannot be too strongly stressed. There is only a small quantity of rubber distributed through a relatively large volume of the absorbent powdered material; therefore if the rubber required vulcanization after mixture thereof with the powdered absorbent material it would be necessary to provide a great amount of sulphur and accelerators, as a large proportion of these chemicals would be absorbed by the powdered material and would not, therefore, be available to take part in the vulcanisation of the rubber binder. The resulting separator would consequently contain a high percentage of sulphur and other chemicals which would affect its efficiency as a battery separator, by interfering with the correct action of the battery. Moreover, should it be attempted to vulcanize the separator after formation as aforesaid, the resulting structure would present objectionably hard and stiff surfaces which would tend to isolate electrolyte from the active agent in a battery and defeat the purpose of providing a readily conforming mass effective to hold the electrolyte intimately against the battery plates and said active agent. The use of a pre-vulcanized binding agent overcomes the difficulties referred to.

Preferably the absorbent material comprises acid-washed and calcined kieselguhr, although aluminium oxide and powdered ceramic materials have been found to be satisfactory. These substances must be finely powdered and have highly developed surfaces, which produce the desired texture in the finished separator. Kieselguhr, aluminum oxide and powdered ceramic material comprise alternative forms of powdered, sulphuric-acid-proof absorbents, but the kieselguhr is preferred.

In the preferred form of separating element the binding agent is composed of the latex of synthetic rubber, barium hydroxide conveniently being added to the latex to produce slow coagulation. A hydrophilic colloid may be incorporated in order to prevent the premature coagulation of the rubber in the latex.

In one method of carrying the invention into effect a paste is prepared comprising the following ingredients:

100 lbs. kieselguhr (acid-washed and calcined).
½ lb. gum karaya.
10 lbs. neoprene latex (calculated on the dry content).
660–1100 lbs. distilled water (as required).

In order to prevent the premature coagulation of the neoprene (polychloroprene) latex the gum karaya is incorporated either with the kieselguhr or with the latex before these two substances are themselves brought together. A small quantity of barium hydroxide or other suitable polyvalent base or salt is preferably added in order to bring about a slow coagulation of the latex, said base or salt being, of course, one which will not subsequently endanger the solidity of the separator by reacting with the acid electrolyte in the cell. Glass wool in sheet form is spread on one or both sides with the above mentioned pasty mix, this process being carried out by hand or by any convenient mechanical device, and the laminae including the glass wool sheets are dried, say in a warm room. They are then ready for use in the assembly of the electric cell, but they are preferably sujected to pressure between a pair of plates in a press so as to render them relatively smooth and compact. If desired several thicknesses of the pasted glass wool sheets can be pressed together so as to produce a single relatively thick sheet adapted to serve as a stronger separator. After the pressing operation the separators in form and texture somewhat resemble stout blotting paper, for although they have a relatively smooth surface and are without apparent pores, they are completely absorbent to liquid such as the acid electrolyte normally used in dry secondary cells. The glass wool, is of course completely immune from the effects of the acid electrolyte and also the nascent oxygen produced during the charging of the cell, and experiments have shown that the other constituents of the separator remain unaffected during the normal life of the cell. While the glass wool sheets lie sandwich fashion between the masses of absorbent material in an assembled battery, or between applications of the powdered absorbent material in the formed separators before assembly in batteries, they are not intended as reinforcing means for the separators, except in the sense that they serve to support the fragile assemblies prior to and during the assembly thereof in battery structures, or in other words, during handling. It should be understood also that the glass wool sheets act only as carriers or supports for the powdered absorbent applique and are not intended as a means providing interstices in which to retain electrolyte.

Instead of Neoprene latex various other binding agents may be used, such as ordinary rubber latex in its prevulcanised form, while the latices of the rubbery materials known under the trademarks Duroprene (solution of chlorinated rubber) and Buna (copolymer of butadiene) are also applicable, in order to produce a soft resilient binding material in the finished separator.

In place of the gum karaya other hydrophilic colloids can be used, such, for example, as gum tragacanth, sodium alginate and sodium silicate.

As another example the invention may be carried into effect by using a paste comprising the following:

100 lbs. kieselguhr (acid-washed and calcined).
1 lb. sodium alginate.
20 lbs. 60% pre-vulcanised rubber latex (calculated on the dry rubber content).
275 lbs. distilled water.

This is applied to the glass wool sheets as before and, after drying, is pressed or rolled to form a compact and relatively thin absorbent sheet material.

If desired, sodium silicate in 50 per cent solution, i. e. that known as water glass, can be used as the hydrophilic colloid, an example being, say 2 lbs. of water glass, 100 lbs. of kieselguhr and 10 lbs. of latex.

It will of course be appreciated that the mixtures given above are regarded merely as examples and that the proportions may be modified if desired and other materials used for the production of the improved separators. Although the improved separator is primarily intended for use in secondary cells of the so-called dry type, it is applicable also to primary cells and to secondary cells in which there is free liquid electrolyte.

What I claim is:

1. A sheet type porous absorbent element for completely filling the spaces between the plates of a secondary battery of the dry accumulator type and for supporting the plates over their entire surface area, said element comprising a cushion-like compressible layer of absorbent sulphuric-acid resistant mineral particles resiliently held together by minute separate soft and resilient particles of a soft elastomer selected from the group consisting of natural rubber, synthetic rubbers and chlorinated rubber, and a thin supporting sheet of fibrous material.

2. A sheet type porous absorbent element for completely filling the spaces between the plates of a secondary battery of the dry accumulator type and for supporting the plates over their entire surface area, said element comprising a cushion-like compressible layer of absorbent sulphuric-acid resistant mineral particles resiliently held together by minute separate soft and resilient particles of previously vulcanized natural latex and the layer being supported by a thin sheet of glass wool.

3. A sheet type porous absorbent element for completely filling the spaces between the plates of a secondary battery of the dry accumulator type and for supporting the plates over their entire surface area, said element comprising a cushion-like compressible layer of kieselguhr, the particles of said kieselguhr being resiliently held together by minute separate soft and resilient particles of a soft elastomer selected from the group consisting of natural rubber, synthetic rubbers, and chlorinated rubber, and a thin supporting sheet of glass wool.

4. A sheet type porous absorbent element for completely filling the spaces between the plates of a secondary battery of the dry accumulator type and for supporting the plates over their entire surface area, said element comprising a cushion-like compressible layer of absorbent sulphuric-acid resistant mineral particles resiliently held together by minute separate soft and resilient particles of previously vulcanized natural latex and a thin supporting sheet of fibrous material.

5. A sheet type porous absorbent element for completely filling the spaces between the plates of a secondary battery of the dry accumulator type and for supporting the plates over their entire surface area, said element comprising a cushion-like compressible layer of kieselguhr, the particles of said kieselguhr being resiliently held together by minute separate soft and resilient particles of a soft elastomer selected from the group consisting of natural rubber, synthetic rubbers, and chlorinated rubber, and a thin supporting sheet of fibrous material.

6. A sheet type porous absorbent element for completely filling the spaces between the plates of a secondary battery of the dry accumulator type and for supporting the plates over their entire surface area, said element comprising a cushion-like compressible layer of kieselguhr, the particles of said kieselguhr being resiliently held together by minute separate soft and resilient particles of previously vulcanized natural rubber, and a thin supporting sheet of glass wool.

7. A sheet type porous absorbent element as defined in claim 6, in which the rubber is present in from ten to fifteen per cent of the total weight.

8. A sheet type porous absorbent element for completely filling the spaces between the plates of a secondary battery of the dry accumulator type and for supporting the plates over their entire surface area, said element comprising a cushion-like compressible layer of kieselguhr, the particles of said kieselguhr being resiliently held together by minute separate soft and resilient particles of synthetic rubber, and a thin supporting sheet of glass wool.

9. A sheet type porous absorbent element for completely filling the spaces between the plates of a secondary battery of the dry accumulator type and for supporting the plates over their entire surface area, said element comprising a cushion-like compressible layer of kieselguhr, the particles of said kieselguhr being resiliently held together by minute separate soft and resilient particles of neoprene, and a thin supporting sheet of glass wool.

JONAS ABRAHAM SZPER.

REFERENCES CITED

The following references are of record in the file of this patent:

UNITED STATES PATENTS

| Number | Name | Date |
| --- | --- | --- |
| 1,256,864 | Becker | Feb. 19, 1918 |
| 1,526,942 | Steerup | Feb. 17, 1925 |
| 1,576,440 | Martin | Mar. 9, 1926 |
| 1,908,719 | Willson | May 16, 1933 |
| 1,942,668 | Smith | Jan. 9, 1934 |
| 2,101,449 | Parry | Dec. 7, 1937 |
| 2,117,371 | Slayter | May 17, 1938 |
| 2,155,016 | Kershaw | Apr. 18, 1939 |

FOREIGN PATENTS

| Number | Country | Date |
| --- | --- | --- |
| 451,628 | Great Britain | Aug. 10, 1936 |